US012759372B2

(12) United States Patent
Kawaguchi et al.

(10) Patent No.: US 12,759,372 B2
(45) Date of Patent: Oct. 13, 2026

(54) INFORMATION PROCESSING DEVICE

(71) Applicant: TOYOTA JIDOSHA KABUSHIKI KAISHA, Toyota (JP)

(72) Inventors: Keizoh Kawaguchi, Okazaki (JP); Kazumi Aono, Tokyo (JP); Yuki Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/953,607

(22) Filed: Nov. 20, 2024

(65) Prior Publication Data

US 2025/0187395 A1 Jun. 12, 2025

(30) Foreign Application Priority Data

Dec. 7, 2023 (JP) ................................ 2023-207078

(51) Int. Cl.
*B60H 1/00* (2006.01)

(52) U.S. Cl.
CPC ....... *B60H 1/0073* (2019.05); *B60H 1/00392* (2013.01); *B60H 1/00657* (2013.01)

(58) Field of Classification Search
CPC .............. B60H 1/0073; B60H 1/00392; B60H 1/00657; B60H 1/00778; B60H 1/00771; B60H 1/00385; B60H 1/00428; B60H 1/00735; B60H 1/00814; B60L 1/00; B60L 58/12
See application file for complete search history.

(56) References Cited

U.S. PATENT DOCUMENTS

| | | | | |
|---|---|---|---|---|
| 2012/0109408 | A1* | 5/2012 | Siy | B60L 1/02 701/1 |
| 2014/0330453 | A1 | 11/2014 | Nakagawa | |
| 2023/0406152 | A1* | 12/2023 | Ko | B60L 53/68 |

FOREIGN PATENT DOCUMENTS

| | | | |
|---|---|---|---|
| JP | 2011-235807 | A | 11/2011 |
| JP | 2019-081470 | A | 5/2019 |
| JP | 2020-162247 | A | 10/2020 |
| JP | 2021-167156 | A | 10/2021 |
| WO | 2013/124990 | A1 | 8/2013 |

* cited by examiner

*Primary Examiner* — Rodney A Butler
(74) *Attorney, Agent, or Firm* — SoraIP, Inc.

(57) ABSTRACT

A control unit configured to execute: acquiring information on a first distance, which is a travel distance required for a vehicle; activating remote air conditioning in response to a request to activate remote air conditioning of the vehicle and a remaining charge amount of a battery of the vehicle being greater than a first remaining amount, which is a remaining charge amount of a battery capable of traveling the first distance; and deactivating remote air conditioning in response to the remaining charge amount of the battery becoming equal to or less than the first remaining amount during operation of the remote air conditioning.

4 Claims, 3 Drawing Sheets

VEHICLE INFORMATION DB 321

| VEHICLE ID | USER ID | POSITION | ROUTE | REMAINING CHARGE AMOUNT | CHARGE STATUS |
|---|---|---|---|---|---|
| ××× | ××× | ××× | ××× | ××× | ××× |

INFORMATION PROCESSING DEVICE

CROSS-REFERENCE TO RELATED APPLICATION

This application claims priority to Japanese Patent Application No. 2023-207078 filed on Dec. 7, 2023, incorporated herein by reference in its entirety.

BACKGROUND

1. Technical Field

The present disclosure relates to an information processing device.

2. Description of Related Art

Techniques for starting remote air conditioning in consideration of remaining battery capacity are known (see, for example, Japanese Unexamined Patent Application Publication No. 2011-235807 (JP 2011-235807 A)). It is known that after the start of remote air conditioning, temperature and the remaining battery capacity are reported to a user to allow the user to determine whether to continue the air conditioning or not (see, for example, International Publication No. 2013/124990 (WO 2013/124990)).

SUMMARY

An object of the present disclosure is to restrain the remaining charge amount of a battery from becoming insufficient while a vehicle is traveling.

One aspect of the present disclosure is an information processing device, including a control unit that is configured to execute: acquiring information about a first distance that is a travel distance required for a vehicle,

- operating remote air conditioning of the vehicle when a request for operating the remote air conditioning of the vehicle is present, and a remaining charge amount of a battery of the vehicle is larger than a first remaining amount that is the remaining charge amount of the battery that allows travel of the first distance, and
- stopping the remote air conditioning when the remaining charge amount of the battery becomes equal to or less than the first remaining amount while the remote air conditioning is in operation.

The present disclosure can also be regarded as an information processing method for executing processing of the information processing device by a computer. The present disclosure can also be regarded as an information processing program that causes a computer to execute the information processing method or a non-transitory storage medium storing the information processing program.

According to the present disclosure, it is possible to restrain the remaining charge amount of the battery from becoming insufficient while the vehicle is traveling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figures 1, 2:
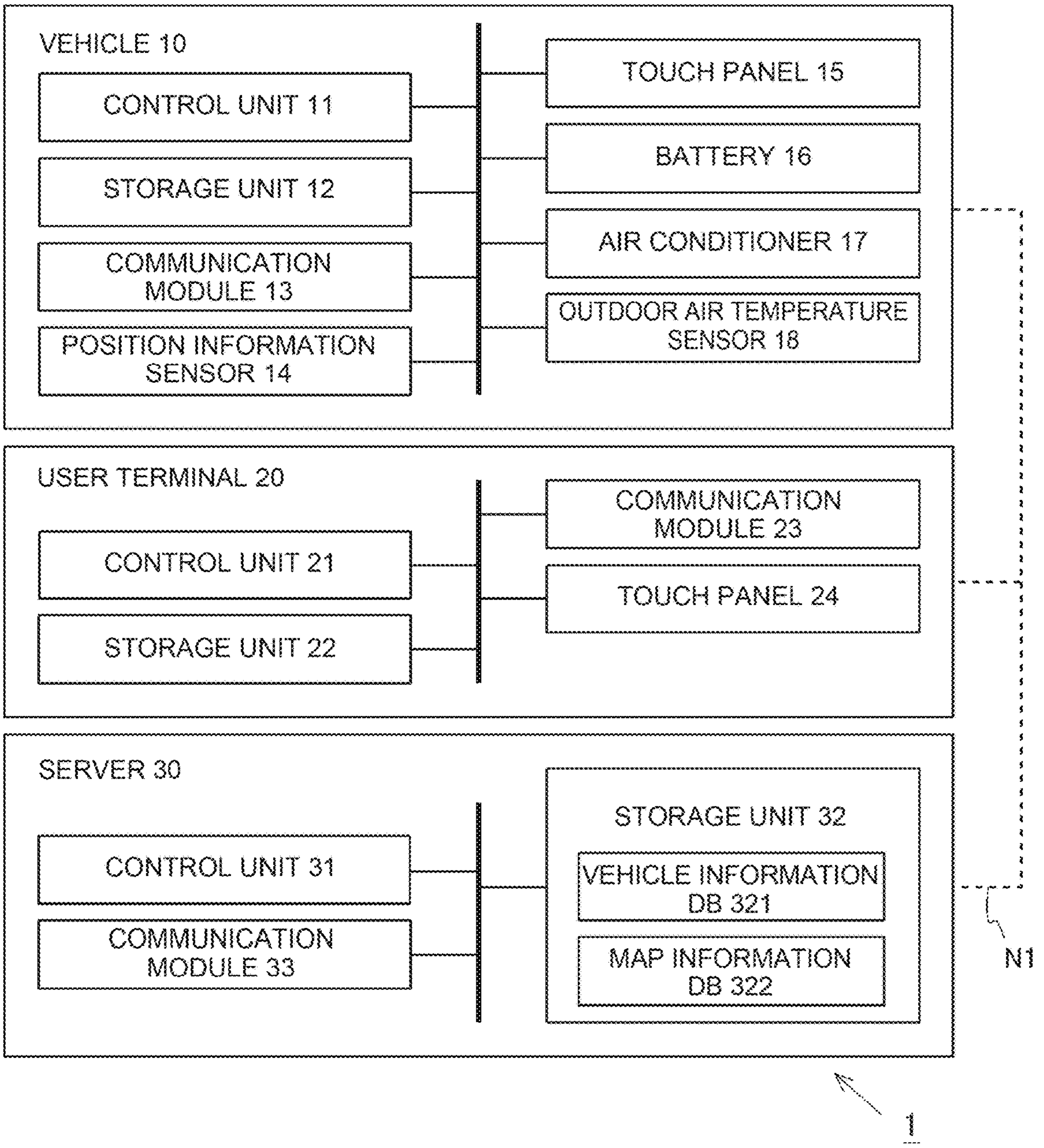
FIG. 1 is a schematic diagram of a system according to an embodiment.
FIG. 2 is a diagram illustrating a table configuration of a vehicle information DB according to the embodiment.

An information processing device according to one aspect of the present disclosure operates remote air conditioning on a condition that, when a request to operate air conditioning of a vehicle is received remotely, a remaining charge amount of a battery capable of traveling a distance requested by a user can be secured. Note that the remote air conditioning is, for example, air conditioning performed by the user by remote operation from the outside of the vehicle, and is performed by the user transmitting a request to perform air conditioning using the user terminal from the outside of the vehicle.

Therefore, the control unit included in the information processing device acquires information on the first distance, which is the travel distance required for the vehicle. The first distance is, for example, a distance from the current location to the destination, and is a travel distance that the user obtains from the vehicle. The first distance may be a distance specified by the user, and may be, for example, a distance to a destination set by the navigation system. Further, the control unit may estimate a route of the vehicle and calculate a distance corresponding to the route as the first distance.

Then, the control unit operates the remote air conditioning in response to a request to operate the remote air conditioning of the vehicle, and the remaining charge amount of the battery of the vehicle is larger than the first remaining amount which is the remaining charge amount of the battery capable of traveling the first distance. In addition, the control unit stops the remote air conditioning in response to the remaining charge amount of the battery becoming equal to or less than the first remaining amount during the operation of the remote air conditioning. The request to operate the remote air conditioning of the vehicle is received by the control unit, for example, from a terminal of the user. The first remaining amount is a remaining charge amount of the battery correlated with the first distance. The remaining charge amount of the battery may be state of charge (SOC). Only when the remaining charge amount of the battery is larger than the first remaining amount, by operating the remote air conditioning, even though the remaining charge amount of the battery is equal to or less than the first remaining amount, it is possible to suppress the remote air conditioning from being operated. Note that the remote air conditioning may be operated in response to the remaining charge amount of the battery being larger than the amount obtained by adding a predetermined amount to the first remaining amount. The predetermined amount is a remaining charge amount added as a remaining charge amount consumed when the remote air conditioning is operated. For example, the predetermined amount may be determined such that the remote air conditioning is activated for a predetermined time. The predetermined amount may be arbitrarily determined by the user. Further, although the remaining charge amount of the battery decreases when the remote air conditioning is operated, when the remaining charge amount becomes equal to or less than the first remaining amount, the control unit stops the remote air conditioning, so that it is possible to prevent the remaining charge amount of the battery from becoming less than the first remaining amount. Therefore, it is possible to prevent the remaining charge amount of the battery from being insufficient while the vehicle is moving.

Hereinafter, an embodiment of the present disclosure will be described with reference to the drawings. The hardware configuration, the module configuration, the functional configuration, and the like described in the following embodiments are not intended to limit the technical scope of the disclosure only thereto unless otherwise specified.

First Embodiment

FIG. 1 is a schematic diagram of a system 1 according to an embodiment. The system 1 is a system capable of remotely operating an air conditioner (hereinafter referred to as an air conditioner) of the vehicle 10 in accordance with a request transmitted from the user terminal 20 to the server 30. In the example of FIG. 1, the system 1 includes a vehicle 10, a user terminal 20, and a server 30. There may be a plurality of vehicles 10 and a plurality of user terminals 20. The server 30 may include a plurality of servers. The vehicles 10, the user terminals 20, and the servers 30 are connected to each other by a network N1. Note that the network N1 may be, for example, a global public communication network such as the Internet, a Wide Area Network (WAN) or another communication network. In addition, the network N1 may include a telephone communication network such as a mobile phone network and a wireless communication network such as Wi-Fi (registered trademark).

The server 30 can be configured as a computer including a processor (such as a CPU, GPU), a main storage device (such as a RAM, ROM), and a secondary storage device (such as an EPROM, a hard disk drive, and a removable medium). The secondary storage device stores an operating system (OS), various programs, various tables, and the like, and by executing the programs stored therein, it is possible to realize functions (software modules) that meet predetermined objectives, as will be described later. However, some or all of the modules may be realized as hardware modules by, for example, hardware circuitry such as an ASIC, FPGA.

The server 30 includes a control unit 31, a storage unit 32, and a communication module 33. The control unit 31 is an arithmetic unit that realizes various functions of the server 30 by executing a predetermined program. The control unit 31 can be realized by, for example, a hardware processor such as a CPU. The control unit 31 may include a RAM, ROM, a cache memory, and the like. Details of the control unit 31 will be described later.

The storage unit 32 is a unit that stores information, and is configured by a storage medium such as a RAM, a magnetic disk, or a flash memory. The storage unit 32 stores a program executed by the control unit 31, data used by the program, and the like. In addition, a database (vehicle information DB 321 and map information DB 322) is constructed in the storage unit 32. The vehicle information DB 321 stores information collected from the vehicles 10.

FIG. 2 is a diagram exemplifying a table configuration of the vehicle information DB 321 according to the embodiment. The vehicle information DB 321 includes fields of a vehicle ID, a user ID, a position, a route, a remaining charge amount, and a charge state. In the vehicle ID field, information (vehicle ID) capable of identifying the vehicle 10 is stored. In the user ID field, information (user ID) capable of identifying the user or the user terminal 20 is stored. In the position field, position information transmitted from the vehicle 10 is stored. In the route field, information about a route transmitted from the vehicle 10 is stored. Note that the information on the route includes information on the destination. Further, the information on the route may be information on the route predicted by the control unit 31 of the server 30 based on the route of the vehicle 10 up to the present time and the past travel history. AI may be used to predict this. Further, the information on the route may be generated by the control unit 31 of the server 30. In this case, the control unit 31 may generate a route according to the destination input to the user terminal 20 by the user. Further, as will be described later, the information on the route may be generated by the control unit 21 of the user terminal 20. Then, the information on the route may be transmitted from the user terminal 20 to the server 30. In the remaining charge amount field, information on the remaining charge amount of the battery 16 transmitted from the vehicle 10 is stored. In the charging status field, information capable of determining whether or not the battery 16 is being charged from the external power source is stored. Information that can determine whether or not the battery 16 is being charged from the external power source is transmitted from the vehicle 10 to the server 30. When a user registers usage through application software (hereinafter, simply referred to as an application) capable of executing remote air conditioning from the user terminal 20, the control unit 31 associates the vehicle ID with the user ID.

The map information DB 322 stores map data including a feature position, and map information including point of interest (POI) information of characters, photographs, and the like indicating properties of respective points on the map data. Note that the map information DB 322 may be provided from another system connected to the network N1, for example, a Geographic Information System (GIS).

The communication module 33 is a communication interface for connecting the servers 30 to the network N1. The communication module 33 may be configured to include, for example, a network interface board, a wireless communication interface for wireless communication, and the like. The server 30 can perform data communication with the vehicle 10 and the user terminal 20 via the communication module 33.

The vehicle 10 is a battery electric vehicle (BEV) equipped with an electric motor. The vehicle 10 includes a control unit 11, a storage unit 12, a communication module 13, a position information sensor 14, a touch panel 15, a battery 16, an air conditioner 17, and an outside air temperature sensor 18. These components are connected to each other by a CAN bus, which is a bus of an in-vehicle network. These components may be components such as a Data Communication Module (DCM), a head unit, a navigation system, an air conditioner system, and a traveling system.

The control unit 11 can be realized by, for example, a hardware processor such as a CPU. In addition, the control unit 11 may be configured to include a RAM, a read only memory (ROM), a cache memory, and the like. The storage unit 12 is a unit that stores information, and is configured by a storage medium such as a RAM, a magnetic disk, or a flash memory. The storage unit 12 stores a program executed by the control unit 11, data used by the program, and the like.

The communication module 13 is a communication unit for connecting the vehicles 10 to the network N1. In the present embodiment, vehicles 10 can communicate with other devices (for example, servers 30) over a network N1 using a mobile communication service such as 3G, LTE, 5G, 6G. The position information sensor 14 acquires position information (for example, latitude and longitude) of the vehicle 10 at a predetermined cycle. The position information sensor 14 is, for example, a Global Positioning System (GPS) receiver, a radio communication unit, or the like. The touch panel 15 is a device that receives an input from a user and a device that presents information to the user. The touch panel 15 is a touch panel display including, for example, a Liquid Crystal Display (LCD) or an Electroluminescence (EL) panel. The battery 16 is a secondary battery that supplies electric power to an electric motor that drives the vehicle 10 and the air conditioner 17. The battery 16 is charged by an external power source. The air conditioner 17 is a device that is operated by electric power supplied from the battery 16 to adjust the temperature inside the vehicle 10. The outside air temperature sensor 18 is a sensor that detects a temperature outside the vehicle 10.

The control unit 11 of the vehicle 10 acquires the position information, the route and the destination set in the navigation system, the remaining charge amount of the battery 16, information that can determine whether or not the battery 16 is charging, and the like at predetermined intervals, associates the information with the vehicle ID, and transmits the information to the servers 30. Here, the position information is acquired by the position information sensor 14. In addition, the control unit 11 of the vehicle 10 operates the air conditioner 17 upon receiving a command to operate the remote air conditioning from the server 30. In addition, the control unit 11 of the vehicle 10 stops the operation of the air conditioner 17 upon receiving a command to stop the operation of the remote air conditioning from the server 30. The control unit 11 of the vehicle 10 generates a route according to the destination input by the user via the touch panel 15.

The user terminal 20 is a terminal used by a user of the vehicle 10, and is, for example, a smart phone, a tablet terminal, a wearable terminal, or a Personal Computer (PC). An application capable of remotely operating the air conditioning of the vehicle 10 is installed in the user terminal 20. The user terminal 20 includes a control unit 21, a storage unit 22, a communication module 23, and a touch panel 24. These components have the same configuration as the control unit 11, the storage unit 12, the communication module 13, and the touch panel 15 of the vehicle 10.

In addition, the control unit 21 of the user terminal 20 activates the application in response to the user tapping the icon of the application corresponding to the remote air conditioning displayed on the touch panel 24. Further, when the user performs an input for operating the remote air conditioning via the touch panel 24, the control unit 21 of the user terminal 20 generates a request for operating the remote air conditioning and transmits the request to the server 30. In addition, the control unit 21 of the user terminal 20 may display a screen for the user to input the destination of the vehicle 10 when receiving an input for operating the remote air conditioning. The control unit 21 of the user terminal 20 may transmit information on the destination of the vehicle 10 input by the user to the touch panel 24 to the server 30. The information on the destination is an example of information on the first distance. The information about the destination may be included in the request to activate the remote air conditioning to be transmitted to the server 30. As another example, the control unit 21 of the user terminal 20 may generate a route of the vehicle 10 according to the destination input via the touch panel 24, and transmit information on the generated route to the server 30.

Further, as another example, the control unit 21 of the user terminal 20 may generate a route of the vehicle 10 according to the destination input to the touch panel 24, and further calculate a distance of the generated route. The distance of the route calculated at this time corresponds to the first distance. Then, the control unit 21 of the user terminal 20 may transmit the calculated first distance to the server 30. As another example, the user can input a required travel distance via the touch panel 24. That is, the user can also specify the first distance. When receiving the designation of the first distance, the control unit 21 of the user terminal 20 may display a screen for the user to input the first distance. The control unit 21 of the user terminal 20 may transmit information on the first distance input by the user to the touch panel 24 to the server 30.

The control unit 31 of the server 30 receives, from the vehicle 10, position information acquired by the position information sensor 14, a route and a destination set in the navigation system, a remaining charge amount of the battery 16, information that can determine whether or not the battery 16 is being charged, and the like. Here, the position information is acquired by the position information sensor 14. Upon receiving the information from the vehicle 10, the control unit 31 stores the information in the vehicle information DB 321. In addition, the control unit 31 of the server 30 can transmit a command for operating the remote air conditioning to the vehicle 10. The control unit 31 may receive the route, the destination, or the first distance from the user terminal 20 and store the route, the destination, or the first distance in the vehicle information DB 321.

In addition, the control unit 31 of the server 30 receives a request to operate the remote air conditioning of the vehicle 10 from the user terminal 20. In the user terminal 20, the user activates an application for activating remote air conditioning, and performs a predetermined input for activating remote air conditioning. Then, the control unit 21 of the user terminal 20 transmits a request to activate the remote air conditioning to the server 30. In addition, when a request to operate remote air conditioning is received from the user terminal 20, the control unit 31 of the server 30 determines whether or not the remaining charge amount of the battery 16 of the vehicle 10 is larger than the first remaining amount which is the remaining charge amount of the battery 16 that can travel a distance to the destination. The distance to the destination is a travel distance required for the vehicle 10 and corresponds to the first distance. The first distance is, for example, a distance to a destination set in the navigation system of the vehicle 10. Note that the first distance may be calculated by the control unit 11 of the vehicle 10 and transmitted to the server 30, or may be calculated by the control unit 31 of the server 30 based on the information on the route and the destination. For example, the control unit 11 of the vehicle 10 transmits, to the server 30, information regarding a route and a destination set in the navigation system at predetermined time intervals. The control unit 31 of the server 30 that has received the information on the route and the destination calculates the first distance based on the information stored in the map information DB 322. Further, the control unit 31 calculates the remaining charge amount of the battery 16 required to travel the first distance. For example, an expression for calculating the remaining charge amount of the battery 16 required to travel the first distance from the first distance may be stored in the storage unit 32. Then, the control unit 31 may obtain the remaining charge amount of the battery 16 required to travel the first distance by substituting the first distance into the equation.

When the travel distance of the vehicle 10 is equal to or greater than the travel distance to the destination of the vehicle 10, the vehicle 10 may reach the destination before the remaining charge amount of the battery 16 is insufficient. Therefore, in this case, the control unit 31 of the server 30 operates the remote air conditioning. On the other hand, when the travel distance of the vehicle 10 is shorter than the travel distance to the destination of the vehicle 10, the remaining charge amount of the battery 16 may be insufficient before the vehicle 10 reaches the destination. Therefore, in this case, the control unit 31 of the server 30 does not operate the remote air conditioning. When the travel distance of the vehicle 10 becomes shorter than the travel distance to the destination of the vehicle 10 during the operation of the remote air conditioning, the control unit 31 of the server 30 stops the remote air conditioning.

When the battery 16 is being charged using an external power source, the electric power consumed by the air conditioner 17 can be supplied from the external power source. Therefore, the control unit 31 may operate the remote air conditioning regardless of whether or not the remaining charge amount of the battery 16 is larger than the first remaining amount.

Figure 3:
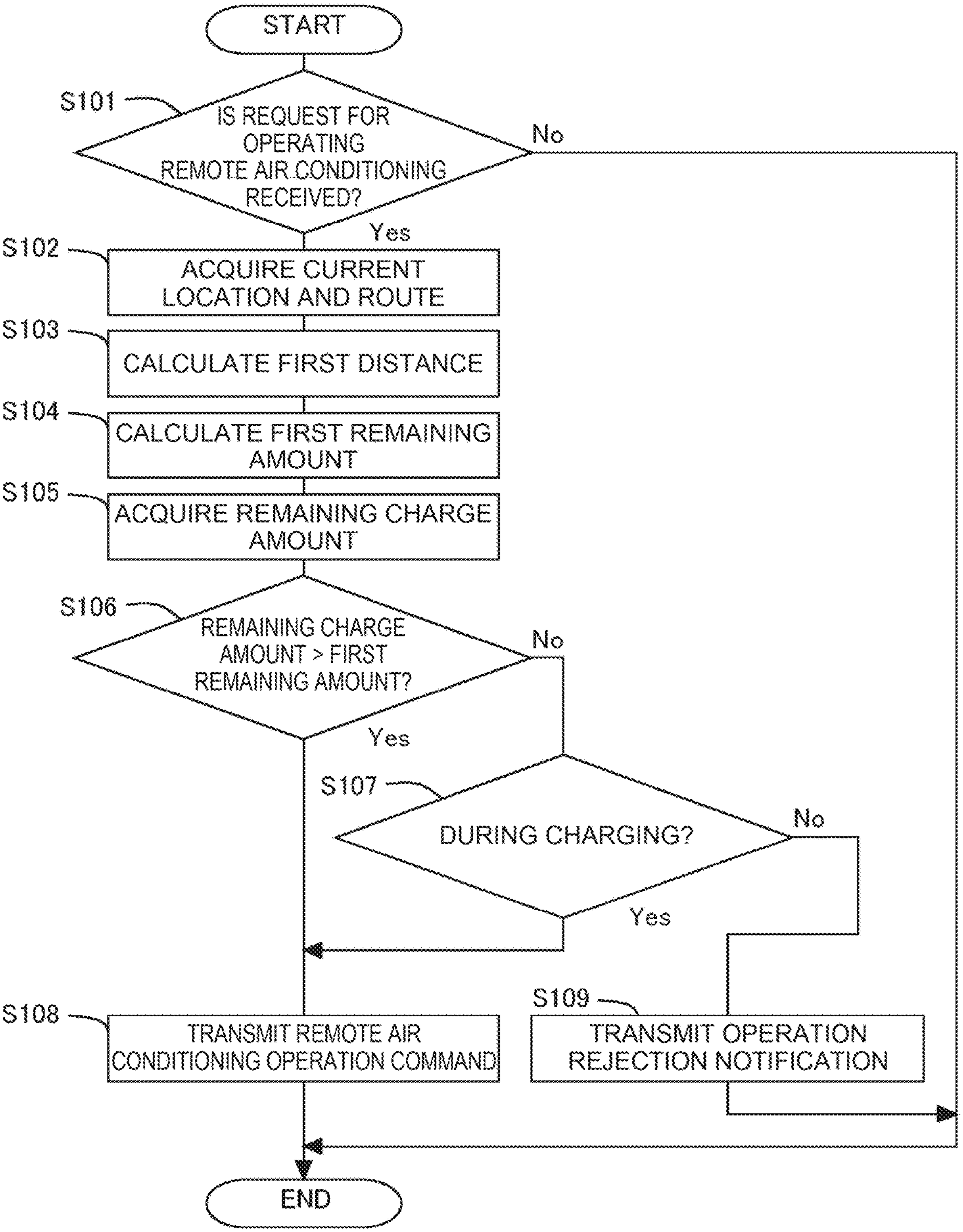
FIG. 3 is a flow chart illustrating a process performed by the servers according to the embodiment.

FIG. 3 is a flowchart illustrating processing in the server 30 according to the embodiment. The flowchart illustrated in FIG. 3 is executed in the server 30 at predetermined time intervals. Note that the vehicle information DB 321 and the map information DB 322 will be described on the assumption that required information is stored.

In S101, the control unit 31 determines whether or not a request to operate the remote air conditioning is received from the user terminal 20. If the control unit 31 makes an affirmative determination in S101, the process proceeds to S102, and if a negative determination is made, the routine ends. In S102, the control unit 31 acquires the current location and route of the vehicle 10 from the vehicle information DB 321. Note that the route also includes information on the destination. In S103, the control unit 31 calculates the first distance. The control unit 31 calculates the first distance from the current position of the vehicle 10, the destination of the vehicle 10, and the route of the vehicle 10 while referring to the map information DB 322. As another example, the control unit 31 may acquire the first distance from the vehicle 10 or the user terminal 20.

In S104, the control unit 31 calculates the first remaining amount. The first remaining amount is calculated by substituting the first distance calculated in S103 into the calculation expression stored in the storage unit 32. In S105, the control unit 31 acquires the remaining charge amount. The control unit 31 refers to the vehicle information DB 321 and acquires the most recent remaining charge amount of the battery 16. In S106, the control unit 31 determines whether or not the remaining charge amount acquired by S105 is larger than the first remaining amount calculated by S104. If the control unit 31 makes an affirmative determination in S106, the process proceeds to S108, and if it makes a negative determination, the process proceeds to S107.

In S107, the control unit 31 determines whether the battery 16 of the vehicle 10 is being charged. The control unit 31 refers to the latest charge status field of the vehicle information DB 321 and determines whether the battery 16 of the vehicle 10 is being charged. If the control unit 31 makes an affirmative determination in S107, the process proceeds to S108, and if it makes a negative determination, the process proceeds to S109. Note that S107 process may be omitted. If the control unit 31 makes a negative determination on S106, the process proceeds to S109.

In S108, the control unit 31 transmits a remote air conditioning operation command, which is a command to operate the remote air conditioning, to the vehicles 10. The control unit 11 of the vehicle 10 that has received the remote air conditioning operation command operates the remote air conditioning. On the other hand, in S109, the control unit 31 transmits an operation disable notification, which is a notification that the remote air conditioning cannot be operated, to the user terminal 20. The notification may include a command for displaying a screen corresponding to the remote air conditioning disable notification on the touch panel 24 of the user terminal 20. The control unit 21 of the user terminal 20 that has received the remote air conditioning disable notification displays a screen corresponding to the remote air conditioning disable notification on the touch panel 24.

Figure 4:
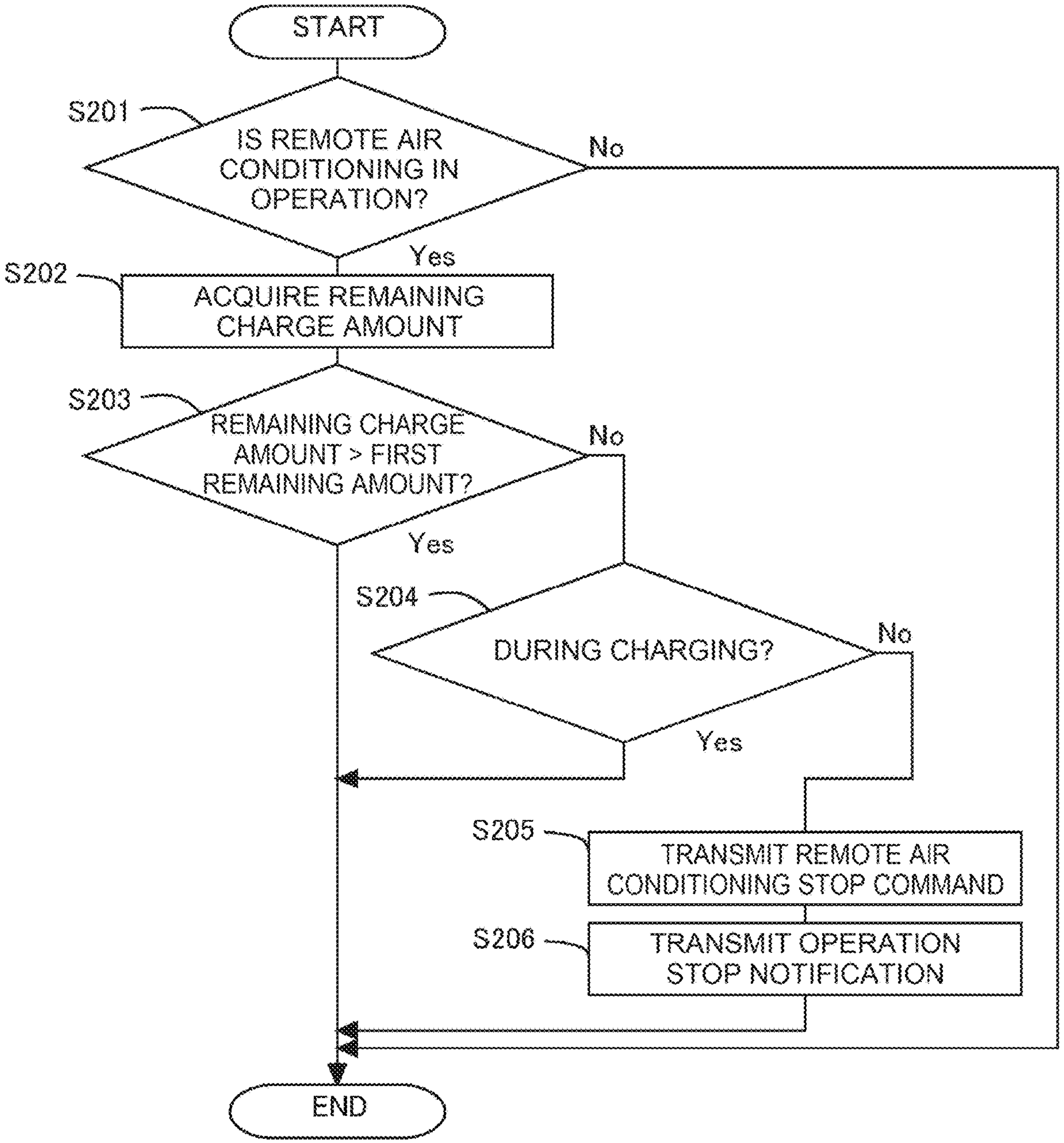
FIG. 4 is a flowchart illustrating a process executed in the server during operation of the remote air conditioning according to the embodiment.

FIG. 4 is a flowchart illustrating a process executed in the server 30 during the operation of the remote air conditioning according to the embodiment. The flowchart illustrated in FIG. 4 is executed in the server 30 at predetermined time intervals. Note that the vehicle information DB 321 and the map information DB 322 will be described on the assumption that required information is stored.

In S201, the control unit 31 determines whether or not the remote air conditioning operation is being performed. The control unit 31 may determine that the remote air conditioning is in operation when a notification indicating that the remote air conditioning is stopped is not received from the vehicle 10 after the remote air conditioning operation command is transmitted to the vehicle 10 in S108. For example, when the vehicle 10 travels while the remote air conditioning is in operation, the remote air conditioning is stopped. In this case, the control unit 11 of the vehicle 10 transmits a notification indicating that the remote air conditioning has been stopped to the server 30. As another example, information that can determine whether or not the remote air conditioning is in operation may be transmitted from the vehicle 10 to the server 30 at predetermined time intervals. If the control unit 31 makes an affirmative determination in S201, the process proceeds to S202, and if a negative determination is made, the routine ends. In S202, the control unit 31 acquires the remaining charge amount. The control unit 31 refers to the vehicle information DB 321 and acquires the most recent remaining charge amount of the battery 16.

In S203, the control unit 31 determines whether or not the remaining charge amount acquired by S202 is larger than the first remaining amount calculated by S104 of the routine illustrated in FIG. 3. The first remaining amount calculated by S104 is stored in the storage unit 32. If the control unit 31 makes an affirmative determination in S203, the routine ends. In this case, the remote air conditioning is continuously operated. On the other hand, when the control unit 31 makes a negative determination in S203, the process proceeds to S204.

In S204, the control unit 31 determines whether the battery 16 of the vehicle 10 is being charged. If the control unit 31 makes an affirmative determination in S204, the routine ends, and if a negative determination is made, the process proceeds to S205. Note that S204 process may be omitted. If the control unit 31 makes a negative determination on S203, the process proceeds to S205.

In S205, the control unit 31 transmits a remote air conditioning stop command, which is a command for stopping the operation of the remote air conditioning, to the vehicles 10. The control unit 11 of the vehicle 10 that has received the remote air conditioning stop command stops the remote air conditioning. Next, in S206, the control unit 31 transmits an operation stop notification, which is a notification indicating that the operation of the remote air conditioning has been stopped, to the user terminal 20. The notification may include a command for displaying a screen corresponding to the operation stop notification on the touch panel 24 of the user terminal 20. Upon receiving the operation stop notification, the control unit 21 of the user terminal 20 causes the touch panel 24 to display a screen corresponding to the operation stop notification.

As described above, according to the present embodiment, since the remote air conditioning is operated while the remaining charge amount is secured, it is possible to prevent the remaining charge amount of the battery 16 from being insufficient before the vehicle 10 reaches the destination. Here, the remaining charge amount is the remaining charge amount of the battery 16 required until the vehicle 10 arrives at the destination.

Second Embodiment

If the air temperature is such that a user uses remote air conditioning, it is highly likely that the air conditioner 17 will be used even during subsequent traveling of the vehicle 10. In this case, since the degree of decrease in the remaining charge amount of the battery 16 is increased depending on the usage state of the air conditioner 17, the distance that the vehicle 10 can travel can be reduced. Therefore, the control unit 31 may correct the first remaining amount according to the outside air temperature. For example, in the case of air temperature using cooling, the first remaining amount may be increased as the outside air temperature is higher. Further, in the case of the air temperature using heating, the first remaining amount may be increased as the outside air temperature is lower. That is, as the air conditioner 17 is used, a larger remaining charge amount is required to travel the first distance, and therefore, the control unit 31 may perform correction so that the first remaining amount becomes larger. The outside air temperature is detected by the outside air temperature sensor 18 of the vehicle 10, and the control unit 11 of the vehicle 10 transmits the outside air temperature to the server 30 at predetermined time intervals. Then, in S104 shown in FIG. 3, when the control unit 31 calculates the first remaining amount, it corrects according to the outside air temperature. For example, the relationship between the outside air temperature and the correction coefficient of the first remaining amount may be stored in advance in the storage unit 32. In this way, the remaining charge amount of the battery 16 can be secured more reliably.

Other Embodiments

The above-described embodiment is merely an example, and the present disclosure may be appropriately modified and implemented without departing from the scope thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

In the above-described embodiment, the control unit 31 of the server 30 executes the routines illustrated in FIGS. 3 and 4, but as another example, the control unit 11 of the vehicle 10 may execute the routines illustrated in FIGS. 3 and 4. In this situation, in S101, the control unit 11 of the vehicle 10 determines whether or not a request to operate the remote air conditioning is received from the server 30. In addition, in S108, the control unit 11 of the vehicle 10 operates the remote air conditioning. In addition, in S109, the control unit 11 of the vehicle 10 transmits an operation disable notification to the user terminal 20 via the server 30. In addition, in S205, the control unit 11 of the vehicle 10 stops the remote air conditioning. In addition, in S206, the control unit 11 of the vehicle 10 transmits an activation/deactivation notification to the user terminal 20 via the server 30.

In addition, the control unit 31 of the server 30 may transmit, to the vehicle 10, a command to stop the remote air conditioning when the remaining charge amount becomes equal to or less than the first remaining amount. In this instance, the process of S106 in FIG. 3 by the control unit 31 of the server 30 is omitted, and the control unit 31 of the server 30 executes the process of S108 after the process of S105. Then, the control unit 11 of the vehicle 10 executes S106 process, and operates the remote air conditioning when the control unit 11 makes an affirmative determination in S106. The processing illustrated in FIG. 4 is executed by the control unit 11 of the vehicle 10. In this instance, in S205, the control unit 11 of the vehicle 10 stops the remote air conditioning, and in S206, the control unit 11 of the vehicle 10 transmits an operation stop notification to the user terminal 20 via the servers 30.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium may be any type of medium suitable for storing electronic commands, for example, a disc of any type such as a magnetic disc (floppy (registered trademark) disc, hard disk drive (HDD), etc.), an optical disc (compact disc read only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card.

What is claimed is:

1. An information processing device comprising a processor configured to:

acquire information about a first distance that is a travel distance required for a vehicle, operate remote air conditioning of the vehicle in a case where:

a request for operating the remote air conditioning of the vehicle is present, and a remaining charge amount of a battery of the vehicle is larger than a first remaining amount, the first remaining amount being a charge amount of the battery that allows travel of the first distance, and stop the remote air conditioning in a case where the remaining charge amount of the battery becomes equal to or less than the first remaining amount, and a memory configured to store a relationship between an external temperature of the vehicle and a correction coefficient for the first remaining amount, wherein the processor is further configured to:

acquire the external temperature, and correct the first remaining amount according to the relationship between the external temperature and the correction coefficient for the first remaining amount.

2. The information processing device according to claim 1, wherein the processor is configured to acquire the information about the first distance from a terminal of a user of the vehicle.

3. The information processing device according to claim 1, wherein the processor is configured to:

acquire information about a route to reach a destination of the vehicle as the information about the first distance, and calculate the remaining charge amount of the battery required to reach the destination in a case where the vehicle travels along the route as the first remaining amount.

4. The information processing device according to claim 1, wherein the processor is configured to operate the remote air conditioning in a case where the battery is being charged, regardless of whether the remaining charge amount of the battery is larger than the first remaining amount.

* * * * *